United States Patent
Jang et al.

(10) Patent No.: US 9,824,054 B2
(45) Date of Patent: Nov. 21, 2017

(54) FIRMWARE UPDATING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jiing-Shyang Jang, New Taipei (TW); Yang Gao, Shenzhen (CN); Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 257 days.

(21) Appl. No.: 14/802,592

(22) Filed: Jul. 17, 2015

(65) Prior Publication Data
US 2017/0017596 A1    Jan. 19, 2017

(51) Int. Cl.
*G06F 13/40*    (2006.01)
*G06F 13/42*    (2006.01)

(52) U.S. Cl.
CPC ........ *G06F 13/409* (2013.01); *G06F 13/4221* (2013.01)

(58) Field of Classification Search
None
See application file for complete search history.

(56) References Cited

U.S. PATENT DOCUMENTS

2008/0244098 A1* 10/2008 Oikawa ............... G06F 3/061
                                                                    710/5
2012/0331181 A1* 12/2012 Govande ............. G06F 8/65
                                                                    710/8
2014/0122753 A1*  5/2014 Chiu ................... G06F 3/0653
                                                                    710/74

\* cited by examiner

*Primary Examiner* — Ernest Unelus
*Assistant Examiner* — Dayton Lewis-Taylor
(74) *Attorney, Agent, or Firm* — Steven Reiss

(57) ABSTRACT

A firmware updating method in just a bunch of disks includes the following blocks. A motherboard is coupled to a first primary storage extension chip or to a second primary storage extension chip. The first primary storage extension chip and the second primary storage extension chip are coupled to each other. At least one secondary storage extension chip is coupled to the first primary storage extension chip. At least one secondary storage extension chip is coupled to the second primary storage extension chip. A signal sent to the first primary storage extension chip or to the second primary storage extension chip by the motherboard causes firmware of each storage extension chip to be updated.

14 Claims, 3 Drawing Sheets

FIRMWARE UPDATING METHOD

FIELD

The subject matter herein generally relates to a firmware updating method in storage devices.

BACKGROUND

As more data is created a system is created to store that data. Storage systems, such as just a bunch of disks (JBOD), are widely used. The JBOD system usually includes different levels of access and a plurality of multilevel extended chips to control a plurality of hard disks. Each level of the extended chip includes a firmware (FW) to carry out a function. When the plurality of FW needs to be updated, the JBOD system will run slowly.

BRIEF DESCRIPTION OF THE DRAWINGS

Implementations of the present technology will now be described, by way of example only, with reference to the attached figures.

DETAILED DESCRIPTION

Figure 1:
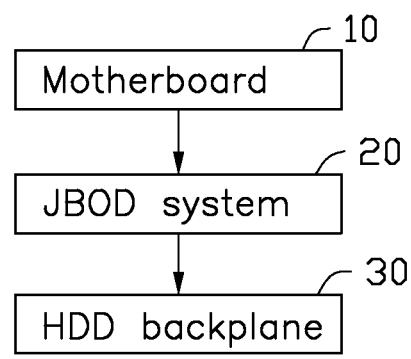
FIG. 1 is a block diagram of one embodiment of a firmware updating method.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

The present disclosure is described in relation to a firmware updating method. The firmware updating method in a storage device includes the following blocks. A motherboard is coupled to a first primary storage extension chip or to a second primary storage extension chip. The first primary storage extension chip and the second primary storage extension chip are coupled to each other. At least one secondary storage extension chip is coupled to the first primary storage extension chip. At least one secondary storage extension chip is coupled to the second primary storage extension chip. A signal can be sent to the first primary storage extension chip or to the second primary storage extension chip by the motherboard whereupon firmware of each storage extension chip is updated.

FIG. 1 illustrates a collection of storage disks laid out as just a bunch of disks (JBOD system 20) and the JBOD system 20 is coupled to a motherboard 10 and a hard disk drive (HDD) backplane 30. The JBOD system 20 exchanges information with the HDD 30 and is controlled by the motherboard 10.

Figure 2:
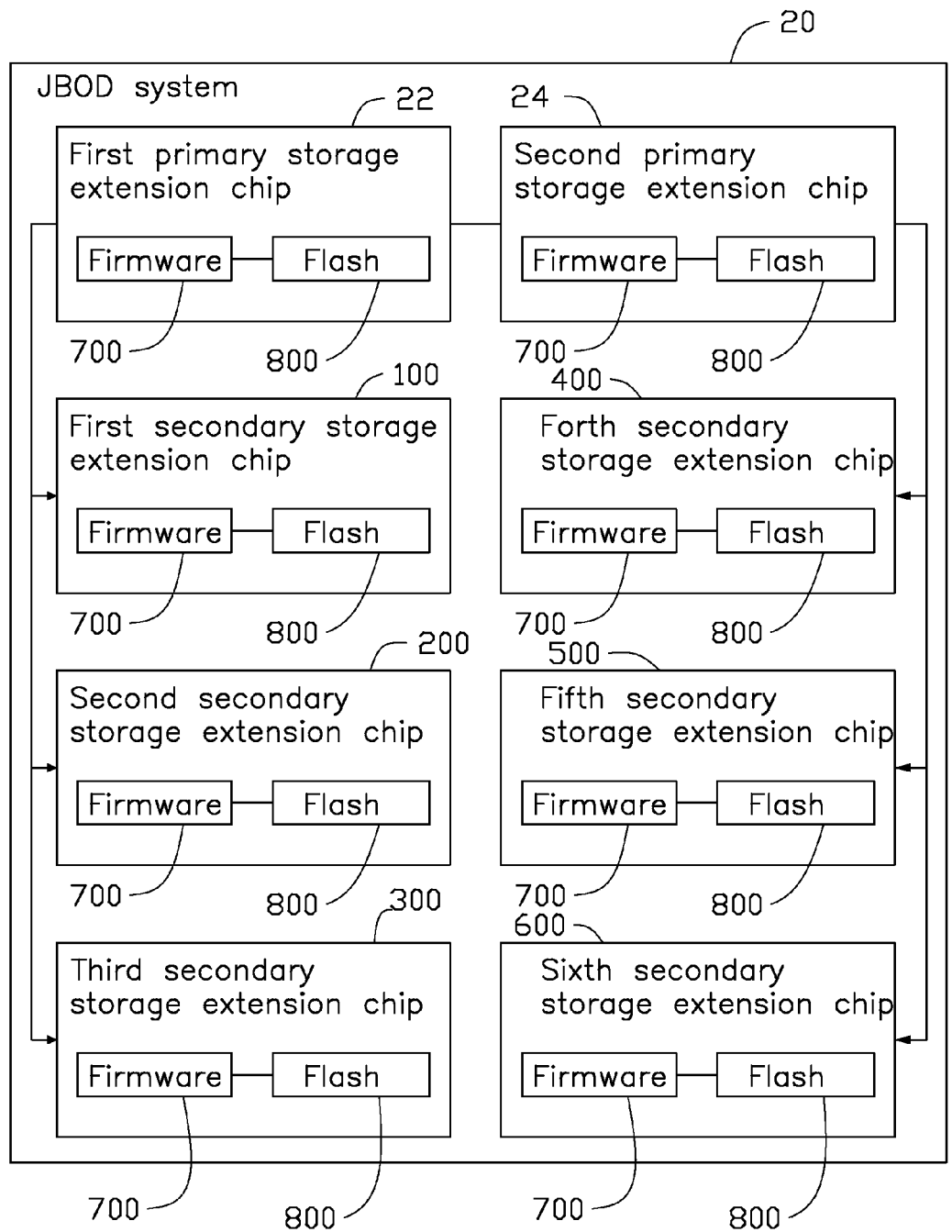
FIG. 2 is a block diagram of a JBOD system of the firmware updating method of FIG. 1.

FIG. 2 illustrates the JBOD system 20. The JBOD system 20 includes a first primary storage extension chip 22 and a second primary storage extension chip 24 coupled to the first primary storage extension chip 22. The first primary storage extension chip 22 and the second primary storage extension chip 24 are primarily redundant. The first primary storage extension chip 22 or the second primary storage extension chip 24 can be coupled to the motherboard 10.

At least one secondary storage extension chip, such as a first secondary storage extension chip 100, a second secondary storage extension chip 200, and a third secondary storage extension chip 300 are coupled to the first primary storage extension chip 22. In at least one embodiment, more secondary storage extension chips can be coupled to the first primary storage extension chip 22. At least one secondary storage extension chip, such as a fourth secondary storage extension chip 400, a fifth secondary storage extension chip 500, and a sixth secondary storage extension chip 600 are coupled to the second primary storage extension chip 24. The first secondary storage extension chip 100, the second secondary storage extension chip 200, and the third secondary storage extension chip 300 are primarily redundant with the fourth secondary storage extension chip 400, the fifth secondary storage extension chip 500, and the sixth secondary storage extension chip 600. The first primary storage extension chip 22 can collect information of the first secondary storage extension chip 100, the second secondary storage extension chip 200, and the third secondary storage extension chip 300. In one embodiment, the information can be temperature and voltage. The second primary storage extension chip 24 can collect information of the fourth secondary storage extension chip 400, the fifth secondary storage extension chip 500, and the sixth secondary storage extension chip 600. In one embodiment, the information can be temperature and voltage.

The first, second, third, fourth, fifth, sixth secondary storage extension chips 100, 200, 300, 400, 500, 600 are coupled to the HDD 30. Each primary storage extension chip and each secondary storage extension chip includes a firmware 700 and a flash 800 coupled to the firmware 700. The firmware 700 can control the flash 800. When the firmware 700 is updated, the flash 800 is updated by the firmware 700.

Figure 3:
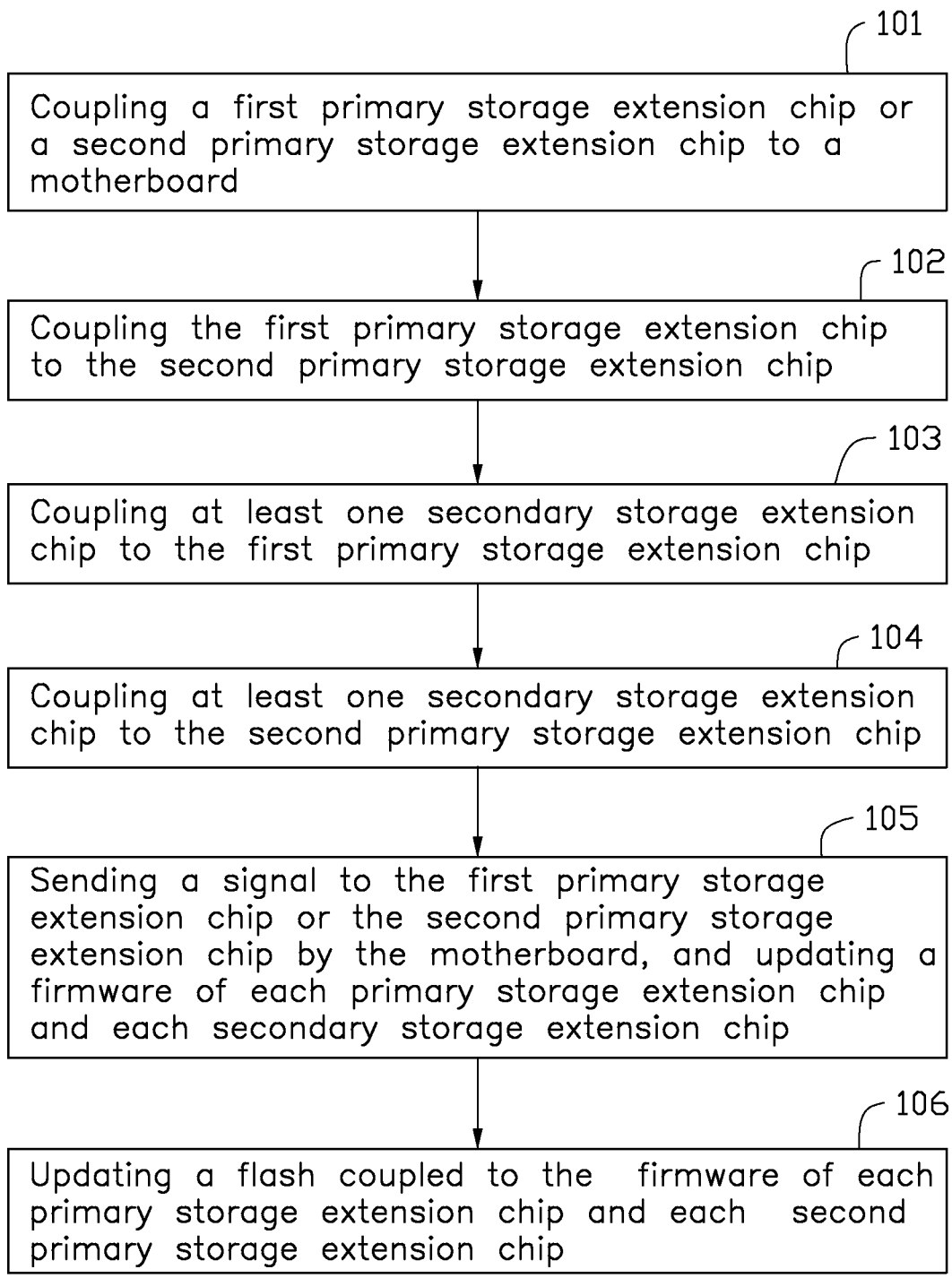
FIG. 3 is a flowchart of an embodiment of a firmware updating method.

FIG. 3 illustrates a flowchart in accordance with the example embodiment. An updating method for the firmware 700 is provided by way of example, as there are a variety of ways to carry out the method. The firmware updating method in storage device described below can be carried out using the configurations illustrated in FIGS. 1-2, for example, and various elements of these figures are referenced in explaining method of updating the firmware 700 in storage device. Each block shown in FIG. 3 represents one or more processes, methods, or subroutines carried out in the method. The illustrated order of blocks is by example only and the order of the blocks can change. Additional blocks may be added or fewer blocks may be utilized without departing from this disclosure. The firmware updating method 700 in storage device can begin at block 101.

At block 101, the motherboard 10 is coupled to the first primary storage extension chip 22 or to the second primary storage extension chip 24.

At block 102, the first primary storage extension chip 22 is coupled to the second primary storage extension chip 24.

At block 103, the first secondary storage extension chip 100, the second secondary storage extension chip 200, and the third secondary storage extension chip 300 are coupled to the first primary storage extension chip 22.

At block 104, the fourth secondary storage extension chip 400, the fifth secondary storage extension chip 500, and the sixth secondary storage extension chip 600 are coupled to the second primary storage extension chip 24.

At block 105, the motherboard 10 sends a signal to the first primary storage extension chip 22 or to the second primary storage extension chip 24 and the first primary storage extension chip 22 or the second primary storage extension chip 24 updates the firmware 700. In one embodiment, firstly, the motherboard 10 sends a signal to the first primary storage extension chip 22 so the firmware 700 of the first primary storage extension chip 22 is updated. Secondly, the firmware 700 of the first secondary storage extension chip 100 may be updated by the first primary storage extension chip 22. Then the firmware 700 of the second secondary storage extension chip 200 is updated by the first primary storage extension chip 22 and the firmware 700 of the secondary storage extension chip 300. Thirdly, the firmware 700 of the second primary storage extension chip 24 may be updated by the first primary storage extension chip 22. Then the firmware 700 of the fourth secondary storage extension chip 400 is updated by the second primary storage extension chip 24. Then the firmware 700 of the fifth secondary storage extension chip 500 is updated by the second primary storage extension chip 24. The firmware 700 of the sixth secondary storage extension chip 600 is later updated by the second primary storage extension chip 24. In at least one embodiment, when a signal is sent to the second primary storage extension chip 24 by the motherboard 10, the firmware 700 of each secondary storage extension chip which is coupled to the second primary storage extension chip 24 is updated by the second primary storage extension chip 27. The firmware 700 of the first primary storage extension chip 22 is updated by the second primary storage extension chip 24, and the firmware 700 of each secondary storage extension chip which is coupled to the first primary storage extension chip 22 is updated by the second primary storage extension chip 24.

At block 106, each firmware 700 sends a signal to the flash 800 coupled to the firmware 700 to update the flash 800.

The embodiments shown and described above are only examples. Many details are often found in the art such as the other features of the firmware updating method in storage device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A firmware updating method comprising:
coupling a first primary storage extension chip or a second primary storage extension chip to a motherboard;
coupling the first primary storage extension chip to the second primary storage extension chip;
coupling at least one secondary storage extension chip to the first primary storage extension chip;
coupling at least one secondary storage extension chip to the second primary storage extension chip;
sending a signal to the first primary storage extension chip or the second primary storage extension chip by the motherboard;
updating a firmware of the first primary storage extension chip and the second primary storage extension chip; and
updating each secondary storage extension chips by the first primary storage extension chip or the second primary storage extension chip;
wherein when sending the signal to the first primary storage extension chip, updating the firmware of the second primary storage extension chips by the first primary storage extension chip and updating the firmware of each secondary storage extension chips which is coupled to the first or second primary storage extension chips by the first primary storage extension chip, and when sending the signal to the second primary storage extension chip, updating the firmware of the first primary storage extension chips by the second primary storage extension chip and updating the firmware of each secondary storage extension chips which is coupled to the first or second primary storage extension chips by the second primary storage extension chip.

2. The updating method of claim 1, further comprising driving a flash of each storage extension chip update by the firmware.

3. The updating method of claim 1, wherein the first primary storage extension chip and the second primary storage extension chip are redundant.

4. The updating method of claim 1, wherein the at least one secondary storage extension chip coupled to the first primary storage extension chip is redundant to the at least one secondary storage extension chip coupled to the second primary storage extension chip.

5. The updating method of claim 1, wherein each secondary storage extension chip is coupled to a hard disk drive to collect information of the hard disk drive.

6. The updating method of claim 1, wherein the first primary storage extension chip and the second primary storage extension chip are configured to collect information of the at least one secondary storage extension chip.

7. The updating method of claim 6, wherein the information is temperature and voltage.

8. A firmware updating method comprising:
coupling a first primary storage extension chip to a second primary storage extension chip;
coupling at least one secondary storage extension chip to the first primary storage extension chip;
coupling at least one secondary storage extension chip to the second primary storage extension chip;
sending a signal to the first primary storage extension chip or the second primary storage extension chip; and
updating a firmware of the first primary storage extension chip and the second primary storage extension chip, and updating each secondary storage extension chips by the first primary storage extension chip or the second primary storage extension chip;
wherein when sending the signal to the first primary storage extension chip, updating the firmware of the second primary storage extension chips by the first primary storage extension chip and updating the firmware of each secondary storage extension chips which is coupled to the first or second primary storage extension chips by the first primary storage extension chip, and when sending the signal to the second primary storage extension chip, updating the firmware of the first primary storage extension chips by the second primary storage extension chip and updating the firmware of each secondary storage extension chips which is coupled to the first or second primary storage extension chips by the second primary storage extension chip.

9. The updating method of claim 8, further comprising driving a flash of each storage extension chip update by the firmware.

10. The updating method of claim 8, wherein the first primary storage extension chip and the second primary storage extension chip are redundant.

11. The updating method of claim 8, wherein the at least one secondary storage extension chip coupled to the first primary storage extension chip is redundant to the at least one secondary storage extension chip coupled to the second primary storage extension chip.

12. The updating method of claim 8, wherein each secondary storage extension chip is coupled to a hard disk drive to collect information of the hard disk drive.

13. The updating method of claim 8, wherein the first primary storage extension chip and the second primary storage extension chip are configured to collect information of the at least one secondary storage extension chip.

14. The updating method of claim 13, wherein the information is temperature and voltage.

* * * * *